US012745771B2

(12) United States Patent
Gaberthueel

(10) Patent No.: US 12,745,771 B2
(45) Date of Patent: Sep. 29, 2026

(54) METHODS OF CONTROLLING OR PREVENTING INFESTATION OF SOYBEAN PLANTS BY PHYTOPATHOGENIC MICROORGANISMS

(71) Applicant: SYNGENTA CROP PROTECTION AG, Basel (CH)

(72) Inventor: Matthias Gaberthueel, Basel (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 893 days.

(21) Appl. No.: 17/425,158

(22) PCT Filed: Jan. 20, 2020

(86) PCT No.: PCT/EP2020/051309

§ 371 (c)(1),
(2) Date: Jul. 22, 2021

(87) PCT Pub. No.: WO2020/152116

PCT Pub. Date: Jul. 30, 2020

(65) Prior Publication Data

US 2022/0117227 A1 Apr. 21, 2022

(30) Foreign Application Priority Data

Jan. 23, 2019 (EP) .................................... 19153247

(51) Int. Cl.
*A01N 43/40* (2006.01)

(52) U.S. Cl.
CPC .................................... *A01N 43/40* (2013.01)

(58) Field of Classification Search
CPC ...................................................... A01N 43/50
See application file for complete search history.

(56) References Cited

U.S. PATENT DOCUMENTS

| | | | | |
|---|---|---|---|---|
| 9,414,589 | B2 | 8/2016 | O'Sullivan et al. | |
| 11,166,461 | B2 * | 11/2021 | Gaberthueel .......... | A01N 57/24 |
| 2016/0075653 | A1 | 3/2016 | Decor et al. | |

FOREIGN PATENT DOCUMENTS

| | | | | |
|---|---|---|---|---|
| CN | 104203916 | A | 12/2014 | |
| GB | 2521255 | A | 6/2015 | |
| WO | 2008135480 | A2 | 11/2008 | |
| WO | 2013143811 | A1 | 3/2013 | |
| WO | 2015003951 | A1 | 1/2015 | |
| WO | WO-2016066644 | A1 * | 5/2016 | ............ A01N 37/18 |
| WO | 2019030307 | A1 | 2/2019 | |

OTHER PUBLICATIONS

Translation of CN Office Action 202080010676.2 dated Dec. 14, 2022, 6 pages.
Written Opinion of the International Searching Authority and International Search Report for International Application No. PCT/EP2020/051309 mailed Feb. 28, 2020.
Extended European Search Report for EP Application No. 19153247.2 mailed Apr. 10, 2019.
Communication pursuant to Article 94(3) EPC issued in European Patent Application No. EP 20 700 836.8, mailed Mar. 28, 2025; total 5 pages.
Canadian Office Action issued in Canadian Patent Application No. 3,127,449 mailed Nov. 28, 2024; total 4 pages.
Translation of the relevant parts of the office action dated Dec. 20, 2022, issued in Eurasian Patent Application No. 202191996; total 3 pages.

* cited by examiner

*Primary Examiner* — Alma Pipic
(74) *Attorney, Agent, or Firm* — BakerHostetler; Toni-Junell Herbert

(57) ABSTRACT

The present invention relates to methods for controlling or preventing infestation of soybean by phytopathogenic microorganisms of the family Corynesporascaceae, in particular *Corynespora cassiicola*, comprising applying to a crop of plants, the locus thereof, or propagation material thereof, a compound according to formula (I), wherein R1, R2, R3, R4, R5, Y, A, B are as defined herein.

(I)

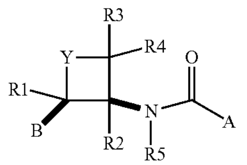

15 Claims, No Drawings

METHODS OF CONTROLLING OR PREVENTING INFESTATION OF SOYBEAN PLANTS BY PHYTOPATHOGENIC MICROORGANISMS

CROSS-REFERENCE TO RELATED APPLICATIONS

This application is a 371 National Stage application of International Application No. PCT/EP2020/051309 filed Jan. 20, 2020, which claims priority to EP 19153247.2, filed Jan. 23, 2019, the entire contents of these applications are hereby incorporated by reference.

TECHNICAL FIELD

The present invention relates to methods for controlling or preventing infestation of soybean plants by phytopathogenic microorganisms of the family Corynesporascaceae, in particular *Corynespora cassiicola*, of the family *Fusarium*, in particular *Fusarium pallidoroseum, tucumaniae, brasiliense, crassistipitatum, Cercospora kikuchi, Colletotrichum truncatum* and *Phomopsis sojae.*

BACKGROUND

*Corynespora cassiicola* is a fungus that infects over 500 species of plants, in particular soybean plants. This pathogen has caused crop failures resulting in high economic losses in over 70 countries. The disease originating from *Corynespora cassiicola* is called target spot.

Thus, the current invention provides further methods for controlling or preventing infestation of soybean plants by phytopathogenic microorganisms of the family Corynesporascaceae, in particular *Corynespora cassiicola*. Furthermore, the current invention provides further methods for controlling or preventing infestation of soybean plants by phytopathogenic microorganisms of the family *Fusarium*, in particular *Fusarium pallidoroseum, tucumaniae, brasiliense, crassistipitatum, Cercospora kikuchi, Phakopsora pachyrhizi* and *Phomopsis sojae.*

DESCRIPTION OF THE EMBODIMENTS

Cyclobutylcarboxamide compounds and processes for their preparation have been disclosed in WO2013/143811 and WO2015/003951. It has now been surprisingly found that particular cyclobutylcarboxamide compounds disclosed in WO2013/143811 and/or WO2015/003951 are highly effective at controlling or preventing the infestation of soybean plants by phytopathogenic microorganisms of the family Corynesporascaceae, in particular *Corynespora cassiicola*. Furthermore, the compounds disclosed in WO2013/143811 and/or WO2015/003951 are effective at controlling or preventing the infestation of soybean plants by phytopathogenic microorganisms such as of the family *Fusarium*, in particular *Fusarium pallidoroseum, tucumaniae, brasiliense, crassistipitatum, Cercospora kikuchi, Phakopsora pachyrhizi* and *Phomopsis sojae.*

These highly effective compounds thus represent an important new solution for farmers to control or prevent infestation of soybean plants by fungi of the family Corynesporascaceae.

Hence, as embodiment 1, there is provided a method of controlling or preventing infestation of soybean plants by phytopathogenic microorganisms of the family Corynesporascaceae, in particular *Corynespora cassiicola*, comprising applying to a crop of plants, the locus thereof, or propagation material thereof, a compound according to formula (I)

(I)

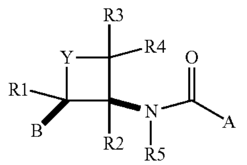

wherein

Y is O, C═O, or CR12R13;

A is a 5- or 6-membered heteroaromatic ring containing 1 to 3 heteroatoms, each independently selected from oxygen, nitrogen and sulphur, or a phenyl ring; the heteroaromatic ring or the phenyl being optionally substituted by one or more R6;

R6 is, independently of each other, halogen, cyano, C1-C4-alkyl, C1-C4-haloalkyl, C1-C4-alkoxy, C1-C4-haloalkoxy, C1-C4-haloalkylthio, C1-C4-alkoxy-C1-4-alkyl or C1-C4-haloalkoxy-C1-C4-alkyl;

R1, R2, R3, R4, R12 and R13, independently of each other, are hydrogen, halogen, cyano, C1-C4-alkyl, C1-C4-alkoxy or C1-C4-haloalkyl, R5 is hydrogen, methoxy or hydroxyl, B is phenyl substituted by one or more R8, R8 is, independently of each other, halogen, cyano or a group -L-R9, where each L is independently of each other a bond, —O—, —OC(O)—, —NR7-, —NR7CO—, —NR7S(O)n-, —S(O)n-, —S(O)nNR7-, —COO— or CONR7-, n is 0, 1 or 2, R7 is hydrogen, C1-C4-alkyl, C1-C4-haloalkyl, benzyl or phenyl, where benzyl and phenyl is unsubstituted or substituted with halogen, cyano, C1-C4-alkyl or C1-C4-haloalkyl, R9 is, independently of each other, C1-C6-alkyl, which is unsubstituted or substituted by one or more R10, C3-C6-cycloalkyl, which is unsubstituted or substituted by one or more R10, C6-C14-bicycloalkyl, which is unsubstituted or substituted by one or more R10, C2-C6-alkenyl, which is unsubstituted or substituted by one or more R10, C2-C6-alkynyl, which is unsubstituted or substituted by one or more R10, phenyl, which is unsubstituted or substituted by R10, or heteroaryl, which is unsubstituted or substituted by one or more R10, R10 is, independently of each other, halogen, cyano, C1-C4-alkyl, C1-C4-haloalkyl, C1-C4-alkoxy, C1-C4-haloalkoxy, C1-C4-alkylthio, C1-C4-haloalkylthio, C3-C6-alkenyloxy, or C3-C6-alkynyloxy;

or a salt or N-oxide thereof;

wherein B and A-CO—NR5 are cis to each other on the four-membered ring, or a tautomer or stereoisomer of these compounds.

Hence, as embodiment 1.1, there is provided a method of controlling or preventing infestation of soybean plants by phytopathogenic microorganisms of the family Corynesporascaceae, in particular *Corynespora cassiicola*, of the family *Fusarium*, in particular *Fusarium pallidoroseum, tucumaniae, brasiliense, crassistipitatum, Cercospora kikuchi* and *Phomopsis sojae*, comprising applying to a crop of plants, the locus thereof, or propagation material thereof, a compound according to formula (I)

(I)

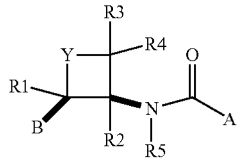

wherein

Y is O, C═O, or CR12R13;

A is a 5- or 6-membered heteroaromatic ring containing 1 to 3 heteroatoms, each independently selected from oxygen, nitrogen and sulphur, or a phenyl ring; the heteroaromatic ring or the phenyl being optionally substituted by one or more R6;

R6 is, independently of each other, halogen, cyano, C1-C4-alkyl, C1-C4-haloalkyl, C1-C4-alkoxy, C1-C4-haloalkoxy, C1-C4-haloalkylthio, C1-C4-alkoxy-C1-4-alkyl or C1-C4-haloalkoxy-C1-C4-alkyl;

R1, R2, R3, R4, R12 and R13, independently of each other, are hydrogen, halogen, cyano, C1-C4-alkyl, C1-C4-alkoxy or C1-C4-haloalkyl, R5 is hydrogen, methoxy or hydroxyl, B is phenyl substituted by one or more R8, R8 is, independently of each other, halogen, cyano or a group -L-R9, where each L is independently of each other a bond, —O—, —OC(O)—, —NR7-, —NR7CO—, —NR7S(O)n-, —S(O)n-, —S(O)nNR7-, —COO— or CONR7-, n is 0, 1 or 2, R7 is hydrogen, C1-C4-alkyl, C1-C4-haloalkyl, benzyl or phenyl, where benzyl and phenyl is unsubstituted or substituted with halogen, cyano, C1-C4-alkyl or C1-C4-haloalkyl, R9 is, independently of each other, C1-C6-alkyl, which is unsubstituted or substituted by one or more R10, C3-C6-cycloalkyl, which is unsubstituted or substituted by one or more R10, C6-C14-bicycloalkyl, which is unsubstituted or substituted by one or more R10, C2-C6-alkenyl, which is unsubstituted or substituted by one or more R10, C2-C6-alkynyl, which is unsubstituted or substituted by one or more R10, phenyl, which is unsubstituted or substituted by R10, or heteroaryl, which is unsubstituted or substituted by one or more R10, R10 is, independently of each other, halogen, cyano, C1-C4-alkyl, C1-C4-haloalkyl, C1-C4-alkoxy, C1-C4-haloalkoxy, C1-C4-alkylthio, C1-C4-haloalkylthio, C3-C6-alkenyloxy, or C3-C6-alkynyloxy;

or a salt or N-oxide thereof;

wherein B and A-CO—NR5 are cis to each other on the four-membered ring, or a tautomer or stereoisomer of these compounds.

More preferred methods according to embodiment 1 are given in the embodiments below.

As embodiment 2, there is provided a method according to embodiment 1 wherein

Y is O or CH2;

A is a 6-membered heteroaromatic ring containing 1 to 2 nitrogen atoms, or a phenyl ring; the heteroaromatic ring or the phenyl being optionally substituted by one or more R6;

R6 is, independently of each other, halogen, cyano, C1-C4-alkyl, C1-C4-haloalkyl, or C1-C4-haloalkoxy;

R1, R2, R3, R4, and R5 are each hydrogen;

B is phenyl substituted by one or more R8;

R8 is, independently of each other, selected from halogen, cyano, C1-C4-alkyl, C1-C4-haloalkyl, C1-C4-haloalkoxy and C3-C6-cycloalkyl.

As embodiment 3, there is provided a method according to either embodiment 1 or embodiment 2 wherein A is a 6-membered heteroaromatic ring containing 1 to 2 nitrogen atoms and having 1 to 3 substituents selected from R6, or a phenyl ring having 1 or 3 substitutents selected from R6.

As embodiment 4, there is provided a method according to any one of embodiments 1 to 3 wherein B is a phenyl substituted by 1 to 3 substitutents R8.

As embodiment 5, there is provided a method according to any one of embodiments 1 to 4 wherein B is a phenyl substituted by 1 to 3 substituents, independently selected from fluoro, chloro, trifluoromethyl, cyclopropyl, difluoromethoxy and trifluoromethoxy;

A is a phenyl, pyridyl or pyrazinyl, which rings, independently of each other, are unsubstituted or substituted by 1 to 3 substituents, independently selected from chloro, bromo, fluoro, methyl, cyano, and trifluoromethyl, Y is O or CH2, and R1, R2, R3, R4 and R5 are each hydrogen.

As embodiment 6, there is provided a method according to any one of embodiments 1 to 5 wherein Y is CH2;

B is a mono or di-halogen substituted phenyl;

A is selected from phenyl, pyrazinyl and pyridyl, each of which is mono or di-substituted by substituents independently selected from halogen and C1-C4-haloalkyl;

R1, R2, R3, R4 and R5 are each hydrogen.

Compounds of formula (I) as disclosed in any one of embodiments 1 to 6 represent the cis racemate: the phenyl ring on the left hand side and the A-C(═O)—NH group on the right hand side are cis to each other on the cyclobutyl ring:

(Ia)

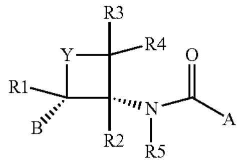

or (Ib)

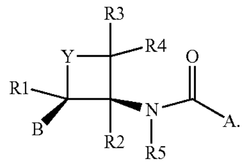

Thus, the racemic compound of formula (I) is a 1:1 mixture of the compounds of formula (Ia) and (Ib). The wedged bonds shown in the compounds of formula (Ia) and (Ib) represent absolute stereochemistry, whereas the thick straight bonds such as those shown for the compounds of formula (I) represent relative stereochemistry in racemic compounds.

It has also surprisingly been found that one enantiomer of the compounds of formula (I) is particularly useful in controlling or preventing the infestation of soybean plants by phytopathogenic microorganisms of the family Corynesporascaceae, in particular *Corynespora cassiicola.*

Thus, as embodiment 7, there is provided the method according to any one of embodiments 1 to 6 wherein the compound is of formula (Ia)

(Ia)

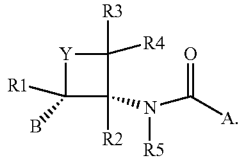

A skilled person is aware that according to the method of embodiment 2, the compound of formula (Ia) is generally applied as part of a pesticidal composition. Hence, as embodiment 8, there is provided a method of controlling or preventing infestation of soybean plants by phytopathogenic microorganisms of the family Corynesporascaceae, in particular *Corynespora cassiicola*, comprising applying to a crop of plants, the locus thereof, or propagation material thereof a pesticidal composition comprising a compound according to anyone of embodiments 1-7 and one or more formulation adjuvants. As embodiment 9, there is provided a method of controlling or preventing infestation of soybean plants by phytopathogenic microorganisms of the family Corynesporascaceae, in particular *Corynespora cassiicola*, comprising applying to a crop of plants, the locus thereof, or propagation material thereof a pesticidal composition comprising a compound of formula (Ia) and one or more formulation adjuvants. In a method according to embodiment 9, for pesticidal compositions comprising both a compound of formula (Ia) and a compound of formula (Ib), the ratio of the compound of formula (Ia) to its enantiomer (the compound of formula (Ib)) must be greater than 1:1. Preferably, the ratio of the compound of formula (Ia) to the compound of formula (Ib) is greater than 1.5:1, more preferably greater than 2.5:1, especially greater than 4:1, advantageously greater than 9:1, desirably greater than 20:1, in particular greater than 35:1.

Mixtures containing up to 50%, preferably up to 40%, more preferably up to 30%, especially up to 20%, advantageously up to 10%, desirably up to 5%, in particular up to 3%, of the trans stereoisomers of the compounds of formula (I) (i.e. wherein the B and the A-C(═O)—NH groups are trans to each other) are also understood to be part of this invention. Preferably, the ratio of the compound of formula (I) to its trans isomer is greater than 1.5:1, more preferably greater than 2.5:1, especially greater than 4:1, advantageously greater than 9:1, desirably greater than 20:1, in particular greater than 35:1.

Preferably, in a composition comprising the compound of formula (Ia), its trans isomer (i.e. wherein the B and the A-CO—NR2 groups are trans to each other) and the compound of formula (Ib), the composition comprises the compound of formula (Ia) in a concentration of at least 50%, more preferably 70%, even more preferably 85%, in particular over 90%, and particularly preferably over 95%, each based on the total amount of compound of formula (Ia), its trans isomer and the compound of formula (Ib).

Further, as embodiment 10, there is provided a method of controlling or preventing infestation of soybean plants by phytopathogenic microorganisms of the family Corynesporascaceae, in particular *Corynespora cassiicola*, comprising applying to a crop of plants, the locus thereof, or propagation material thereof, a compound according to formula (Ic)

(Ic)

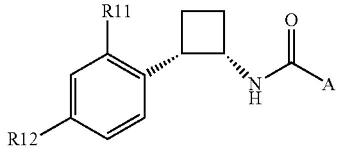

wherein

R11 and R12 are independently selected from halogen;

A is pyridyl which is substituted by one or two substituents independently selected from halogen and $C_1$-$C_4$-haloalkyl.

As embodiment 11, there is provided a method according to embodiment 10, wherein R11 and R12 are independently selected from chloro and fluoro;

A is pyrid-2-yl or pyrid-3-yl, which is substituted by one or two $C_1$-$C_4$-haloalkyl substituents.

As embodiment 12, there is provided a method according to embodiments 10 or 11, wherein A is selected from

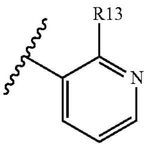 or 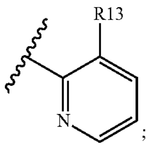 ;

R13 is $C_1$-$C_4$-haloalkyl, preferably trifluoromethyl.

As embodiment 13, there is provided a method according to any one of embodiments 10 to 12 wherein the compound is selected from any one of compounds 1 to 12 of formula (Ic)

(Ic)

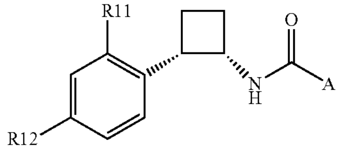

wherein R11, R12 and A are as defined in the following table:

| Compound | A | R11 | R12 |
|---|---|---|---|
| 1 | 2-trifluoromethyl-pyrid-3-yl | Cl | Cl |
| 2 | 3-trifluoromethyl-pyrid-2-yl | Cl | Cl |
| 3 | 3-trifluoromethyl-pyrid-2-yl | F | F |
| 4 | 3-trifluoromethyl-pyrid-2-yl | Cl | F |
| 5 | 3-chloro-pyrid-2-yl | Cl | Cl |
| 6 | 2-methyl-pyrid-3-yl | Cl | Cl |
| 7 | 2-trifluoromethyl-pyrid-3-yl | Cl | F |

As embodiment 14, there is provided the method according to any one of embodiments 1 to 13 comprising the steps providing a composition comprising a compound as defined in any one of embodiments 1 to 13;

applying the composition to a propagation material;

planting the propagation material.

As embodiment 15, there is provided the method according to any one of embodiments 1 to 13 comprising the steps providing a composition comprising a compound as defined in any one of embodiments 1 to 13;

applying the composition to a crop of plants or the locus thereof.

As embodiment 16, there is provided the use of a compound as defined in any one of embodiments 1 to 13 for controlling or preventing infestation of soybean plants by phytopathogenic microorganisms of the family Corynesporascaceae, in particular *Corynespora cassiicola.*

As embodiment 17, there is provided the use of a compound according to embodiment 16 wherein the phytopathogenic microorganism is *Corynespora cassiicola.*

As embodiment 18, there is provided a method for growing soybean plants comprising applying or treating soybean or a propagation material thereof with a compound as defined in any one of claims 1 to 13.

The preparation of the compounds as defined in the methods of any one of embodiments 1 to 13 has been disclosed in WO2013/143811 and WO2015/003951 which are incorporated herein by reference.

Definitions

The term “halogen” represents fluoro, chloro, bromo or iodo, particularly fluoro, chloro or bromo.

The term “alkyl” or “alk” as used herein either alone or as part of a larger group (such as alkoxy, alkylthio, alkoxycarbonyl and alkylcarbonyl) is a straight or branched chain and is, for example, methyl, ethyl, n-propyl, n-butyl, isopropyl, sec-butyl, isobutyl, tert-butyl, pentyl, iso-pentyl or n-hexyl. The alkyl groups are suitably $C_1$-$C_4$-alkyl groups.

“Haloalkyl” as used herein are alkyl groups as defined above which are substituted with one or more of the same or different halogen atoms and are, for example, $CF_3$, $CF_2Cl$, $CF_2H$, $CCl_2H$, $FCH_2$, $ClCH_2$, $BrCH_2$, $CH_3CHF$, $(CH_3)_2CF$, $CF_3CH_2$ or $CHF_2CH_2$.

The methods and uses according to any one of embodiments 1 to 18 are preferably for controlling or preventing infestation of the crop by phytopathogenic microorganisms of the family Corynesporascaceae, in particular *Corynespora cassiicola*, including *Corynespora cassiicola* fungi that are resistant to other fungicides. Corynesporascaceae fungi that are “resistant” to a particular fungicide refer e.g. to strains of Corynesporascaceae fungi that are less sensitive to that fungicide compared to the expected sensitivity of the same species of Corynesporascaceae fungi. The expected sensitivity can be measured using e.g. a strain that has not previously been exposed to the fungicide.

Application according to the methods or uses according to any one of embodiments 1 to 18 is preferably to a crop of plants, the locus thereof or propagation material thereof. Preferably application is to a crop of plants or propagation material thereof, more preferably to propagation material. Application of the compounds of the invention can be performed according to any of the usual modes of application, e.g. foliar, drench, soil, in furrow etc.

The compounds as defined in any one of embodiments 1 to 13 are preferably used for pest control at 1 to 500 g/ha, preferably 10-70 g/ha.

The compounds as defined in any one of embodiments 1 to 13 are suitable for use on any soybean plant, including those that have been genetically modified to be resistant to active ingredients such as herbicides, or to produce biologically active compounds that control infestation by plant pests.

Generally, a compound as defined in any one of embodiments 1 to 13 is used in the form of a composition (e.g. formulation) containing a carrier. A compound as defined in any one of embodiments 1 to 13 and compositions thereof can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra low volume (ulv) liquid, ultra low volume (ulv) suspension, water dispersible granules or tablets, water dispersible powder for slurry treatment, water soluble granules or tablets, water soluble powder for seed treatment and wettable powder.

A formulation typically comprises a liquid or solid carrier and optionally one or more customary formulation auxiliaries, which may be solid or liquid auxiliaries, for example unepoxidized or epoxidized vegetable oils (for example epoxidized coconut oil, rapeseed oil or soya oil), antifoams, for example silicone oil, preservatives, clays, inorganic compounds, viscosity regulators, surfactant, binders and/or tackifiers. The composition may also further comprise a fertilizer, a micronutrient donor or other preparations which influence the growth of plants as well as comprising a combination containing the compound of the invention with one or more other biologically active agents, such as bactericides, fungicides, nematicides, plant activators, acaricides, and insecticides.

The compositions are prepared in a manner known per se, in the absence of auxiliaries for example by grinding, screening and/or compressing a solid compound of the present invention and in the presence of at least one auxiliary for example by intimately mixing and/or grinding the compound of the present invention with the auxiliary (auxiliaries). In the case of solid compounds of the invention, the grinding/milling of the compounds is to ensure specific particle size.

Examples of compositions for use in agriculture are emulsifiable concentrates, suspension concentrates, microemulsions, oil dispersibles, directly sprayable or dilutable solutions, spreadable pastes, dilute emulsions, soluble powders, dispersible powders, wettable powders, dusts, granules or encapsulations in polymeric substances, which comprise—at least—a compound as defined in any one embodiments 1 to 13 and the type of composition is to be selected to suit the intended aims and the prevailing circumstances.

As a rule, the compositions comprise 0.1 to 99%, especially 0.1 to 95%, of compound as defined in any one of embodiments 1 to 13 and 1 to 99.9%, especially 5 to 99.9%, of at least one solid or liquid carrier, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

Examples of foliar formulation types for pre-mix compositions are:

GR: Granules
WP: wettable powders
WG: water dispersable granules (powders)
SG: water soluble granules
SL: soluble concentrates EC: emulsifiable concentrate
EW: emulsions, oil in water
ME: micro-emulsion
SC: aqueous suspension concentrate
CS: aqueous capsule suspension
OD: oil-based suspension concentrate, and
SE: aqueous suspo-emulsion.

Whereas, examples of seed treatment formulation types for pre-mix compositions are:

WS: wettable powders for seed treatment slurry
LS: solution for seed treatment
ES: emulsions for seed treatment
FS: suspension concentrate for seed treatment
WG: water dispersible granules, and
CS: aqueous capsule suspension.

Examples of formulation types suitable for tank-mix compositions are solutions, dilute emulsions, suspensions, or a mixture thereof, and dusts.

As with the nature of the formulations, the methods of application, such as foliar, drench, spraying, atomizing, dusting, scattering, coating or pouring, are chosen in accordance with the intended objectives and the prevailing circumstances.

The tank-mix compositions are generally prepared by diluting with a solvent (for example, water) the one or more pre-mix compositions containing different pesticides, and optionally further auxiliaries.

Suitable carriers and adjuvants can be solid or liquid and are the substances ordinarily employed in formulation technology, e.g. natural or regenerated mineral substances, solvents, dispersants, wetting agents, tackifiers, thickeners, binders or fertilizers.

Generally, a tank-mix formulation for foliar or soil application comprises 0.1 to 20%, especially 0.1 to 15%, of the desired ingredients, and 99.9 to 80%, especially 99.9 to 85%, of a solid or liquid auxiliaries (including, for example, a solvent such as water), where the auxiliaries can be a surfactant in an amount of 0 to 20%, especially 0.1 to 15%, based on the tank-mix formulation.

Typically, a pre-mix formulation for foliar application comprises 0.1 to 99.9%, especially 1 to 95%, of the desired ingredients, and 99.9 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Normally, a tank-mix formulation for seed treatment application comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation for seed treatment application comprises 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Whereas commercial products will preferably be formulated as concentrates (e.g., pre-mix composition (formulation)), the end user will normally employ dilute formulations (e.g., tank mix composition).

Preferred seed treatment pre-mix formulations are aqueous suspension concentrates. The formulation can be applied to the seeds using conventional treating techniques and machines, such as fluidized bed techniques, the roller mill method, rotostatic seed treaters, and drum coaters. Other methods, such as spouted beds may also be useful. The seeds may be presized before coating. After coating, the seeds are typically dried and then transferred to a sizing machine for sizing. Such procedures are known in the art. The compounds of the present invention are particularly suited for use in soil and seed treatment applications.

In general, the pre-mix compositions of the invention contain 0.5 to 99.9 especially 1 to 95, advantageously 1 to 50, % by mass of the desired ingredients, and 99.5 to 0.1, especially 99 to 5, % by mass of a solid or liquid adjuvant (including, for example, a solvent such as water), where the auxiliaries (or adjuvant) can be a surfactant in an amount of 0 to 50, especially 0.5 to 40, % by mass based on the mass of the pre-mix formulation.

The invention will now be illustrated by the following non-limiting Examples. All citations are incorporated by reference.

Furthermore, there is provided a method of controlling or preventing infestation of potato plants by the phytopathogenic microorganism *Alternaria alternata fusarium sambucinum*, comprising applying to a crop of plants, the locus thereof, or propagation material thereof, a compound according to any one of embodiments 1 to 13. There is provided a method of controlling or preventing infestation of beans by the phytopathogenic microorganism *Sclerotium rolfsii*, comprising applying to a crop of plants, the locus thereof, or propagation material thereof, a compound according to any one of embodiments 1 to 13. There is provided a method of controlling or preventing infestation of rapeseed plants by the phytopathogenic microorganism *Leptosphaeria maculans*, comprising applying to a crop of plants, the locus thereof, or propagation material thereof, a compound according to any one of embodiments 1 to 13. There is provided a method of controlling or preventing infestation of *celosia* plants by the phytopathogenic microorganism *Botrytis cinerea*, comprising applying to a crop of plants, the locus thereof, or propagation material thereof, a compound according to any one of embodiments 1 to 13. There is provided a method of controlling or preventing infestation of coffee plants by the phytopathogenic microorganism *Cercospora coffeicola*, comprising applying to a crop of plants, the locus thereof, or propagation material thereof, a compound according to any one of embodiments 1 to 13. There is provided a method of controlling or preventing infestation of cotton plants by phytopathogenic microorganisms selected from *Corynespora cassiicola, Fusarium* sp., *Ramularia areola, Thanatephorus cucumeris*, comprising applying to a crop of plants, the locus thereof, or propagation material thereof, a compound according to any one of embodiments 1 to 13. There is provided a method of controlling or preventing infestation of cucumber plants by phytopathogenic microorganisms selected from *COLLETOTRICHUM LAGENARIUM; ERYSIPHE CICHORACEARUM; PSEUDOPERONOSPORA CUBENSIS, PSEUDOPERONOSPORA CUBENSIS, SPHAEROTHECA* SP. and *Fusarium* sp., comprising applying to a crop of plants, the locus thereof, or propagation material thereof, a compound according to any one of embodiments 1 to 13. There is provided a method of controlling or preventing infestation of cucurbits plants by phytopathogenic microorganisms selected from *ALTERNARIA ALTERNATA; SPHAEROTHECA FULIGINEA, DIDYMELLA BRYONIAE* and *SPHAEROTHECA FULIGINEA*, comprising applying to a crop of plants, the locus thereof, or propagation material thereof, a compound according to any one of embodiments 1 to 13. There is provided a method of controlling or preventing infestation of cucurbits plants by phytopathogenic microorganisms selected from *SCLEROTINIA MINOR* and *SCLEROTINIA SCLEROTIORUM*, comprising applying to a crop of plants, the locus thereof, or propagation material thereof, a compound according to any one of embodiments 1 to 13. There is provided a method of controlling or preventing infestation of melon plants by the phytopathogenic microorganism *FUSARIUM OXYSPORUM* F. *MELONIS*, comprising applying to a crop of plants, the locus thereof, or propagation material thereof, a compound according to any one of embodiments 1 to 13. There is provided a method of controlling or preventing infestation of okra plants by the phytopathogenic microorganism *FUSARIUM OXYSPORUM* F. SP. APII, comprising applying to a crop of plants, the locus thereof, or propagation material thereof, a compound according to any one of embodiments 1 to 13. There is provided a method of controlling or preventing infestation of onion plants by the phytopathogenic microorganism *BOTRYTIS* SP., comprising applying to a crop of plants, the locus thereof, or propagation material thereof, a compound according to any one of embodiments 1 to 13. There is provided a method of controlling or preventing infestation of ornamental plants by phytopathogenic microorganisms selected from *ALTERNARIA* SP. and *RHIZOCTONIA SOLANI*, comprising applying to a crop of plants, the locus thereof, or propagation material thereof, a compound according to any one of embodiments 1 to 13. There is provided a method of controlling or preventing infestation of pepper plants by the phytopathogenic microorganism *Leveillula taurica*, comprising applying to a crop of plants, the locus thereof, or propagation material thereof, a compound according to any one of embodiments 1 to 13. There is provided a method of controlling or preventing infestation of *petunia* plants by the phytopathogenic microorganism *ERYSIPHE CICHORACEARUM*, comprising applying to a crop of plants, the locus thereof, or propagation material thereof, a compound according to any one of embodiments 1 to 13. There is provided a method of controlling or preventing infestation of potato plants by the phytopathogenic microorganism *ALTERNARIA ALTERNATA FUSARIUM SAMBUCINUM*, comprising applying to a crop of plants, the locus thereof, or propagation material thereof, a compound according to any one of embodiments 1 to 13. There is provided a method of controlling or preventing infestation of squash plants by phytopathogenic microorganisms selected from *Erysiphe* spp and *SPHAEROTHECA FULIGINEA*, comprising applying to a crop of plants, the locus thereof, or propagation material thereof, a compound according to any one of embodiments 1 to 13. There is provided a method of controlling or preventing infestation of tomato plants by phytopathogenic microorganisms selected from *Alternaria solani, FUSARIUM OXYSPORUM F. LYCOPERSICI, OIDIOPSIS TAURICA; PHYTOPHTHORA INFESTANS* and *PYTHIUM APHANIDERMATUM*, comprising applying to a crop of plants, the locus thereof, or propagation material thereof, a compound according to any one of embodiments 1 to 13. There is provided a method of controlling or preventing infestation of watermelon plants by phytopathogenic microorganisms selected from *DIDYMELLA BRYONIAE, FUSARIUM OXYSPORUM* F. SP. *NIVEUM, FUSARIUM OXYSPORUM* and *SPHAEROTHECA FULIGINEA*, comprising applying to a crop of plants, the locus thereof, or propagation material thereof, a compound according to any one of embodiments 1 to 13. There is provided a method of controlling or preventing infestation of zucchini plants by the phytopathogenic microorganism *SPHAEROTHECA FULIGINEA*, comprising applying to a crop of plants, the locus thereof, or propagation material thereof, a compound according to any one of embodiments 1 to 13.

Biological Examples

Effect of Different Fungicide Treatments Against *Corynespora cassiicola*

A soybean field trial was carried out in Richland, Louisianna, USA, to evaluate the efficacy of different compounds against the target spot *Corynespora cassiicola*. The seed were treated with different seed treatment compounds and planted on June 9. Target spot occurred mid of September and an assessment on disease severity and crop defoliation was done on September 14.

Trial Details

| | Trial Location | Sown | Variety | Resistance Status |
|---|---|---|---|---|
| 1 | Richland/LA | $9^{th}$ Jun. 2018 | S52-Y7X | Susceptible |

Treatment List—Field Trials Carried Out

| | Treatment | AI Rate (mg ai/seed) | Application method |
|---|---|---|---|
| 1 | Untreated | — | — |
| 2 | COMPOUND 1 (FS 500) | 0.075 | Seed treatment |
| 3 | COMPOUND 1 (FS 500) | 0.15 | Seed treatment |
| 4 | Commercial Standard: Succinate dehydrogenase inhibitor (FS 500) | 0.075 | Seed treatment |

Crops and Targets Occurred in the Trial

| | Latin name | Common name |
|---|---|---|
| Target | *CORYNESPORA CASSIICOLA* | TARGET SPOT |
| Crop | *GLYCINE MAX* | SOYBEAN |

Crop Description

| | |
|---|---|
| Test Crop | SOYBEAN |
| Variety | S52-Y7X |
| Sowing or Planting Date | Sep. 6, 2018 |

Trial Layout

| | |
|---|---|
| Trial Environment (Test Method) | Field trial |
| Experimental Design | RANDOMIZED COMPLETE BLOCK |

-continued

| | |
|---|---|
| Plot size | 19 m2 |
| # replications | 4 |

Application Details

| | |
|---|---|
| Application Date | Sep. 6, 2018 |
| Application Equipment Type | Seed treatment Drum |
| Slurry Volume | 400 ml/100 kg seeds |
| Treatments applied | 2, 3, 4 |

Assessments

Pest Severity, 97 Days after Planting

| | Treatment | AI Rate (mg ai/seed) | Pest severity (%), significantly different (Treatments with no letter in common are significantly different at the 5% probability level) | % efficacy based on pest severity |
|---|---|---|---|---|
| 1 | UNTREATED | — | 51.25, A | 0.00 |
| 2 | COMPOUND 1 | 0.075 | 25.00, BC | 51.22 |
| 3 | COMPOUND 1 | 0.15 | 13.25, C | 73.13 |
| 4 | Commercial Standard: Succinate dehydrogenase inhibitor (FS 500) | 0.075 | 47.50, A | 7.32 |

Defoliation, 97 Days after Planting

| | Treatment | AI Rate (mg ai/seed) | Defoliation (% area), significantly different (Treatments with no letter in common are significantly different at the 5% probability level) | % efficacy based on defoliation |
|---|---|---|---|---|
| 1 | UNTREATED | — | 17.5, A | 0.00 |
| 2 | COMPOUND 1 | 0.075 | 6.25, A | 64.29 |
| 3 | COMPOUND 1 | 0.15 | 5, A | 71.43 |
| 4 | Commercial Standard: Succinate dehydrogenase inhibitor (FS 500) | 0.075 | 15, A | 14.28 |

Conclusion

Compound 1 showed good activity (73%) against *Corynespora cassiicola* in soybean over a duration of 97 days after planting. The efficacy of compound 2 was very weak in control of target spot (7.3%). Both rates of compound 1 also provided good suppression of target spot and less defoliation than Compound 2.

The invention claimed is:

1. A method of controlling or preventing infestation of soybean plants by phytopathogenic microorganisms of the family Corynesporascaceae, comprising:

applying to a soybean seed a seed treatment composition comprising:

a compound of formula (Ic)

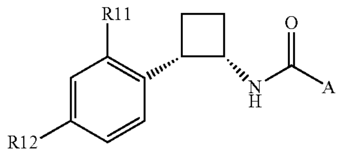

(Ic)

wherein

A is 2-trifluoromethyl-pyrid-3-yl; R11 is Cl; and R12 is Cl, and salts or N-oxides thereof;

and an enantiomer of the compound of formula (Ic);

wherein the ratio of the compound of formula (Ic) to the enantiomer is greater than 4:1 in the seed treatment composition.

2. The method according to claim 1, wherein the phytopathogenic microorganism is *Corynespora cassiicola.*

3. The method according to claim 1, further comprising identifying a field under disease pressure from *Corynespora cassiicola.*

4. The method according to claim 3, wherein the soybean seed is susceptible to *Corynespora cassiicola.*

5. The method according to claim 1, further comprising identifying a soybean seed susceptible to attack by *Cornespora cassiicola.*

6. The method according to claim 5, wherein the soybean seed is susceptible to *Cornespora cassiicola.*

7. The method according to claim 1, wherein the seed treatment is applied at a rate of about 400 ml/100 kg seeds.

8. The method according to claim 7, wherein the compound of formula (Ic) and the enantiomer of the compound of formula (Ic), considered together, is applied at a rate of 0.075 mg/seed to 0.15 mg/seed.

9. The method according to claim 1, wherein the compound of formula (Ic) and the enantiomer of the compound of formula (Ic), considered together, is applied at a rate of 0.075 mg/seed to 0.15 mg/seed.

10. The method according to claim 1, wherein the trans stereoisomers of the compound of formula (Ic) are present up to 20% relative to the combined amount w/w of the trans stereoisomers, the compound of formula (Ic), and the enantiomer of the compound of formula (Ic) in the applying.

11. The method according to claim 2, wherein the *Corynespora cassiicola* is resistant to other fungicides.

12. The method according to claim 2, wherein the applying of the compound of formula (Ic) and the enantiomer of the compound of formula (Ic), considered together, is at a rate of 1-500 g/ha.

13. The method according to claim 12, wherein the applying of the compound of formula (Ic) and the enantiomer of the compound of formula (Ic), considered together, is at a rate of 10-70 g/ha.

14. The method according to claim 2, wherein the applying provides a % efficacy of 51.22% based on pest severity of 25.00%.

15. The method according to claim 2, wherein the applying provides a % efficacy from 51.22% based on pest severity of 25.00% to a % efficacy of 73.13% based on pest severity of 13.25%.

* * * * *